(12) United States Patent
Kokott et al.

(10) Patent No.: US 10,794,441 B2
(45) Date of Patent: *Oct. 6, 2020

(54) BRAKE DISC FOR A VEHICLE

(71) Applicant: Bayerische Motoren Werke Aktiengesellschaft, Munich (DE)

(72) Inventors: Kordian Kokott, Karlsfeld (DE); Josef Hofstetter, Wimpasing (DE); Ulf Schulz, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 175 days.

This patent is subject to a terminal disclaimer.

(21) Appl. No.: 16/014,958

(22) Filed: Jun. 21, 2018

(65) Prior Publication Data

US 2018/0298967 A1    Oct. 18, 2018

Related U.S. Application Data

(63) Continuation of application No. PCT/EP2016/077234, filed on Nov. 10, 2016.

(30) Foreign Application Priority Data

Dec. 22, 2015   (DE) .................... 10 2015 226 451

(51) Int. Cl.
   *F16D 65/12*     (2006.01)
   *B21J 15/02*    (2006.01)
   (Continued)

(52) U.S. Cl.
   CPC ............. *F16D 65/123* (2013.01); *B21J 15/02* (2013.01); *F16B 19/06* (2013.01);
   (Continued)

(58) Field of Classification Search
   CPC .... F16D 65/123; F16D 65/128; F16D 65/125; F16D 2065/1316; F16D 2065/1328;
   (Continued)

(56) References Cited

U.S. PATENT DOCUMENTS 4,848,521 A * 7/1989 Izumine ................ F16D 65/123
                                                       188/18 A
5,520,269 A * 5/1996 Yamamoto ............ F16D 65/123
                                                       188/218 XL
(Continued)

FOREIGN PATENT DOCUMENTS

CN            1811216 A      8/2006
CN          102782355 A     11/2012
(Continued)

OTHER PUBLICATIONS

International Search Report (PCT/ISA/210) issued in PCT Application No. PCT/EP2016/077238 dated Jan. 24, 2017 with English translation (eight pages).

(Continued)

*Primary Examiner* — Pamela Rodriguez
(74) *Attorney, Agent, or Firm* — Crowell & Moring LLP

(57) ABSTRACT

A brake disc for a disc brake includes a brake disc hub and at least one friction ring which is connected to the brake disc hub via rivets, a jacket of the brake disc hub being provided with sections with a reduced wall thickness and/or apertures which are axially directed material cut-outs situated on the outer circumference of the brake disc hub jacket and serve for at least partial positioning of the axially directed rivets. The friction ring and the brake disc hub are centered with respect to one another exclusively via the rivets, and each rivet, before the deformation thereof, is configured so as to taper conically at least over a part region of the rivet shank thereof in the region of the brake disc hub, starting from a swage head to a rivet closing head.

10 Claims, 2 Drawing Sheets

(51) Int. Cl.
*F16B 19/06* (2006.01)
*F16D 65/02* (2006.01)

(52) U.S. Cl.
CPC ............... *F16D 2065/1316* (2013.01); *F16D 2065/1328* (2013.01); *F16D 2065/1344* (2013.01); *F16D 2065/1348* (2013.01); *F16D 2065/1392* (2013.01); *F16D 2200/003* (2013.01); *F16D 2200/0017* (2013.01)

(58) Field of Classification Search
CPC ....... F16D 2200/0021; F16D 2200/034; F16D 2200/003; F16D 2065/1348; F16D 2065/1392; F16D 2200/0017; B21J 15/02; F16B 19/06
See application file for complete search history.

(56) References Cited

U.S. PATENT DOCUMENTS

| | | | |
|---|---|---|---|
| 5,526,905 | A | 6/1996 | Shimazu et al. |
| 6,302,246 | B1 | 10/2001 | Naumann et al. |
| 6,386,341 | B1 | 5/2002 | Martin |
| 6,604,613 | B2 * | 8/2003 | Burgoon ............ F16D 65/0006 188/218 XL |
| 8,210,328 | B2 * | 7/2012 | Kano ..................... F16D 65/12 188/218 XL |
| 2004/0182660 | A1 * | 9/2004 | Cavagna ............... F16D 65/123 188/218 XL |
| 2005/0269174 | A1 | 12/2005 | Lin |
| 2009/0139821 | A1 | 6/2009 | Koppitz et al. |
| 2010/0101902 | A1 | 4/2010 | Kano et al. |
| 2012/0073917 | A1 | 3/2012 | Lee |
| 2012/0097491 | A1 * | 4/2012 | Yamanaka ............ F16D 65/123 188/218 XL |
| 2013/0032440 | A1 | 2/2013 | Karl et al. |
| 2014/0224603 | A1 | 8/2014 | Kokott |
| 2016/0160948 | A1 | 6/2016 | Wagner et al. |
| 2018/0306259 | A1 * | 10/2018 | Kokott .................. F16D 65/123 |

FOREIGN PATENT DOCUMENTS

| | | |
|---|---|---|
| CN | 105408653 A | 3/2016 |
| DE | 1 775 685 A | 9/1971 |
| DE | 198 59 840 A1 | 7/2000 |
| DE | 199 25 003 A1 | 12/2000 |
| DE | 100 32 972 A1 | 1/2002 |
| DE | 10 2006 028 771 A1 | 1/2008 |
| DE | 10 2008 051 598 A1 | 4/2010 |
| DE | 10 2009 046 051 A1 | 5/2010 |
| DE | 10 2009 017 234 A1 | 10/2010 |
| DE | 10 2011 101 126 B3 | 10/2012 |
| DE | 10 2011 084 946 A1 | 4/2013 |
| DE | 10 2013 215 997 A1 | 2/2015 |
| DE | 10 2013 225 538 A1 | 6/2015 |
| EP | 0 475 335 B1 | 11/1993 |
| EP | 0 872 659 A1 | 10/1998 |
| EP | 1 260 728 A1 | 11/2002 |
| GB | 142 468 A | 7/1921 |
| GB | 2 073 834 A | 10/1981 |
| JP | 6-129452 A | 5/1994 |
| JP | 2010-106916 A | 5/2010 |
| JP | 2012-72904 A | 4/2012 |
| WO | WO 2011/018194 A1 | 2/2011 |
| WO | WO 2015/022126 A1 | 2/2015 |

OTHER PUBLICATIONS

German-language Written Opinion (PCT/ISA/237) issued in PCT Application No. PCT/EP2016/077238 dated Jan. 24, 2017 (five pages).

German-language Search Report issued in counterpart German Application No. 10 2015 226 449.1 dated Jun. 30, 2016 with partial English translation (12 pages).

International Search Report (PCT/ISA/210) issued in PCT Application No. PCT/EP2016/077236 dated Jan. 27, 2017 with English translation (seven pages).

German-language Written Opinion (PCT/ISA/237) issued in PCT Application No. PCT/EP2016/077236 dated Jan. 27, 2017 (five pages).

German-language Search Report issued in counterpart German Application No. 10 2015 226 450.5 dated Jun. 30, 2016 with partial English translation (11 pages).

International Search Report (PCT/ISA/210) issued in PCT Application No. PCT/EP2016/077234 dated Jan. 27, 2017 with English translation (eight pages).

German-language Written Opinion (PCT/ISA/237) issued in PCT Application No. PCT/EP2016/077234 dated Jan. 27, 2017 (five pages).

German-language Search Report issued in counterpart German Application No. 10 2015 226 451.3 dated Jun. 30, 2016 with partial English translation (12 pages).

Chinese-language Office Action issued in counterpart Chinese Application No. 201680075032.5 dated Mar. 4, 2019 with English translation (15 pages).

Japanese-language Office Action issued in Japanese Application No. 2018-532749 dated May 27, 2020 with English translation (10 pages).

* cited by examiner

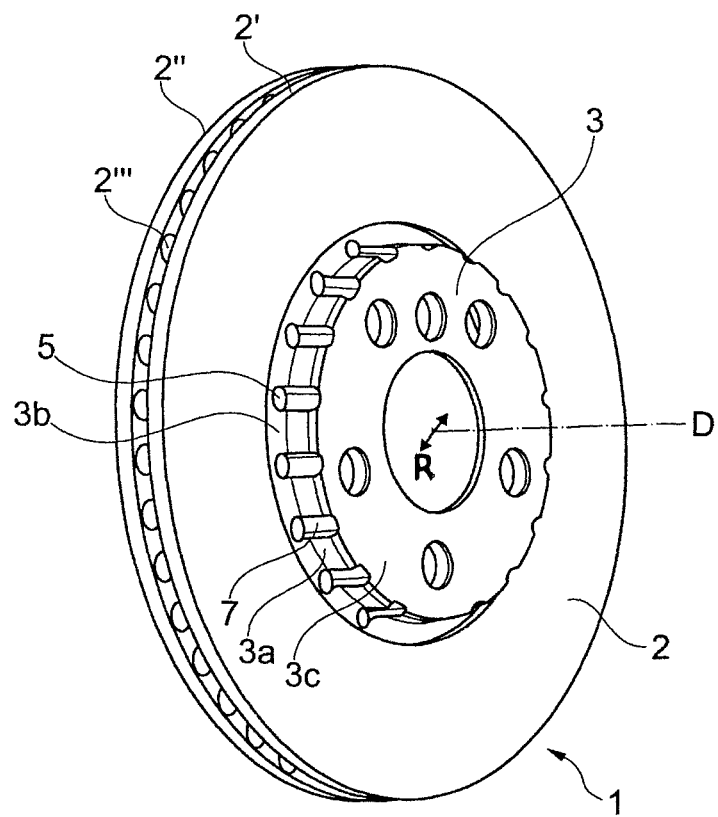
Fig. 1
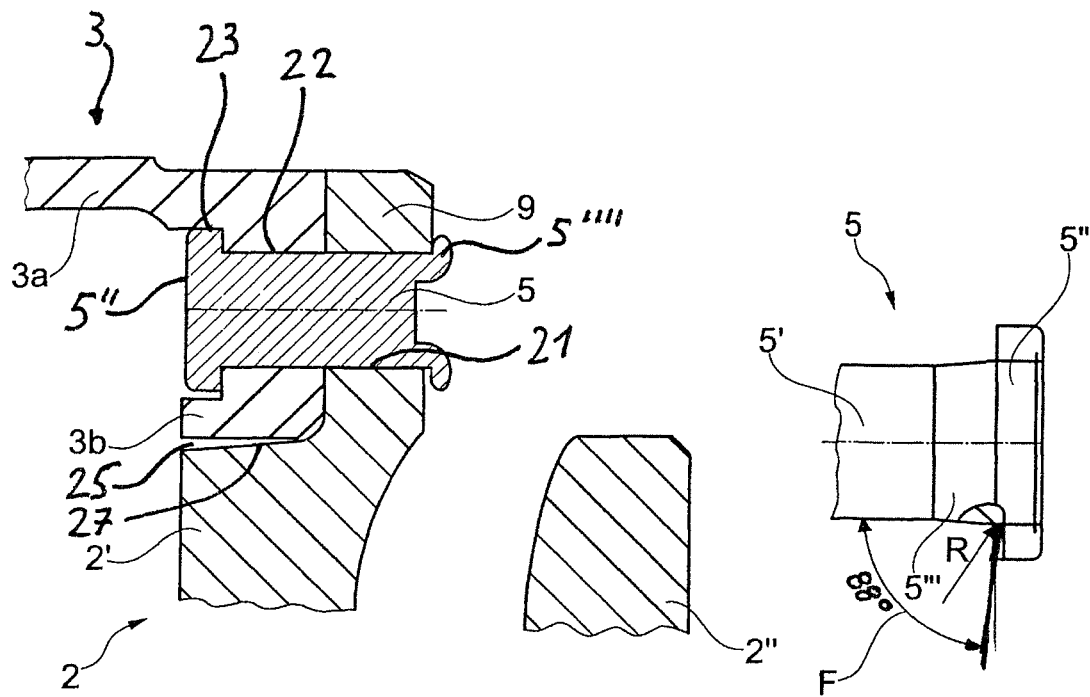
Fig. 2
Fig. 3

BRAKE DISC FOR A VEHICLE

CROSS REFERENCE TO RELATED APPLICATIONS

This application is a continuation of PCT International Application No. PCT/EP2016/077234, filed Nov. 10, 2016, which claims priority under 35 U.S.C. § 119 from German Patent Application No. 10 2015 226 451.3, filed Dec. 22, 2015, the entire disclosures of which are herein expressly incorporated by reference.

This application contains subject matter related to U.S. application Ser. Nos. 16/014,913 and 16/014,946, entitled respectively "Brake Disk for Vehicles" and "Internally Ventilated Brake Disk" filed on Jun. 21, 2018, respectively.

BACKGROUND AND SUMMARY OF THE INVENTION

The invention relates to a composite brake disk for a motor vehicle. Brake disks are constituent parts of a motor-vehicle braking system which are installed coaxially with a wheel and have a friction ring and a brake-disk hub. The brake-disk hub here serves to fasten the brake disk on a wheel hub, whereas the friction ring is brought into tribological contact with the brake pads of the braking system during braking operation. This dissipates the kinetic energy of the motor vehicle in the form of friction heat, and the vehicle is braked.

Such brake disks can be produced in one or more parts, the material of the friction ring being subjected to the greatest amount of stress. Friction rings are therefore usually designed in the form of castings, in particular using GG-15 or GG-25. In order for the heat which is produced during braking operation to be dissipated from the friction ring, such friction rings are often configured in the form of internally ventilated friction rings, that is to say they are provided with channels or bores which have air flowing through them in order thus to improve the dissipation of heat from the friction ring.

Such a brake disk, in the case of which the friction ring or the (usually joined-together) friction rings is or are produced separately from the brake-disk hub and then connected thereto in a suitable manner, has the advantage that the friction ring(s), on the one hand, and the brake-disk hub, on the other hand, can be produced from the materials which are most suitable for the respective requirements. This means that, for example, on the one hand, it is possible to achieve a reduction in weight and, on the other hand, advantageous decoupling between the friction ring and brake-disk hub is thus possible.

DE 100 32 972 A1 describes a composite brake disk, in the case of which the essentially conventionally formed brake-disk hub has a lateral surface which is circular and cylindrical in relation to the axis of rotation of the disk brake and in which through-passages or at least reduced-wall-thickness portions are provided. This brake-disk hub therefore has a certain elasticity which is beneficial for essentially unimpeded thermal friction-ring expansion, i.e. the unavoidable friction-ring expansion is thus not impeded to any significant extent by the brake-disk hub, and therefore stressing is not built up and undesirable friction-ring deformation is ruled out. The material proposed by said document for the brake-disk hub is a higher-strength steel material or the like. This known design requires a relatively large amount of construction space in the radial direction, for which reason use is possible only in the case of relatively large brake-disk dimensions (diameters).

It is an object of the present invention to provide a brake disk in the case of which a suitable connection between the friction ring and brake-disk hub allows the amount of space required for attaching the brake disk to the wheel hub to be kept small. In addition, the intention is to provide a connection between the brake-disk hub and friction ring which, when braking operation creates heat, is also optimized and further improved with respect to the reduction in the build-up of stressing in the brake disk.

This and other objects are achieved according to the invention by a brake disk for a disk brake, which comprises a brake-disk hub and at least one friction ring, which is connected to said brake-disk hub via rivets, wherein a lateral surface of the brake-disk hub is provided with reduced-wall-thickness portions and/or through-passages, which are axially directed material cutouts, which are located on the outer circumference of the lateral surface of the brake-disk hub and serve for the at least partial placement of the axially directed rivets. The friction ring and the brake-disk hub are centered in relation to one another exclusively via the rivets. Starting from a manufactured head, at least over a sub-region of its stem in the region of the brake-disk hub, each rivet, prior to being deformed, has a cone, of which the diameter decreases in the direction of a rivet-closing head.

Centering of the brake-disk hub and friction ring in relation to one another exclusively via the rivets has the advantage that, in case of heating and of different coefficients of expansion of the materials, it is not possible for stressing to occur on account of the two parts being otherwise fixed in relation to one another. In order for it to be possible to ensure an optimum contact pattern of the rivets, specifically in the relevant cross section, these should then be formed in a specific manner, with geometrical provision made in order to compensate for a force-transmission loss which occurs in standard rivets according to the prior art due to the latter, as they deform, forming a tapering barrel shape with a relatively poor contact pattern. Tests have shown that, during the operation of setting the rivet, a leading clearance directly at the manufactured head, for example a cone over a sub-region of the rivet stem, prevents the barrel shape brought about by the riveting process according to the prior art and optimizes the contact pattern of the rivet in the vicinity of the manufactured head.

Furthermore, the brake disk can advantageously be configured such that its friction ring has at least one fastening extension, which is directed inward from the friction surface and to which a collar of a lateral surface of the brake-disk hub is connected by the rivets. The fastening extension creates a support surface for the collar of the brake-disk hub, it being possible for said support surface, like the brake-disk hub prior to the joining operation, to be provided, for example by machine, with a surface quality which is advantageous for the joining pairing. The support surface for the collar of the brake-disk hub and friction ring can be optimized in terms of heat transmission such that the heat transmission, when the friction disk is heated, results in the lowest possible level of stressing in joining partners.

Further advantageous embodiments of the invention are distinguished by the rivet geometry being further optimized. For example, a transition provided from the rivet stem to the manufactured head of the rivet is provided with an axial undercut on the manufactured head of the rivet. Tests have shown that this even further optimizes the contact pattern between the rivet and brake-disk hub, and therefore the connection is suitable for an even greater amount of force transmission over a longer service life. This advantage is also increased, in addition, if the rivets consist of an austenitic, stainless steel. It is possible here for the brake-disk hub to consist of a light metal, a steel or a non-metal material, that is to say suitable materials for the chamber are preferably higher-strength high-strength light metals (inter alia magnesium) or a high-strength, thin-walled sheet steel or aluminum and other non-ferrous or non-metal materials. The brake-disk hub can therefore be produced, for example, by casting, forging or by extrusion. If use is made of a brake-disk hub according to the invention made of a lightweight material, it is possible to use steel wheels in addition to aluminum wheels.

If the brake-disk hub and the friction ring are connected to one another by means of orbital riveting, it is possible for a surface pressure of the rivets even on the gray-cast-material of the friction ring to be kept to as low a level as possible.

In a further advantageous embodiment of the invention, the bore for accommodating the rivet in the collar of the brake-disk hub, said bore corresponding to the bore for accommodating the rivet in the friction disk, has a planar depression at its end which is directed away from the friction disk. The planar depression serves to accommodate a manufactured head of the rivet at least to some extent. This has the advantage that the manufactured head and brake-disk-chamber collar thus form an essentially planar surface, and the amount of dirt and brake-lining dust adhering can therefore be reduced.

Further preferred embodiments of the invention are characterized in that the friction disk which is directed towards the brake-disk hub has an axially directed depression, which is intended for supporting the collar of the brake-disk hub. If, then, the internal diameter of the depression is greater than an external diameter of the collar, and therefore the friction disk is centered in relation to the brake-disk hub exclusively by way of the rivets, this has the advantage that, with it being possible for the support of the brake-disk hub on the friction disk to be machined to best possible effect, it is possible to provide a centering rivet connection between the two parts which, on the one hand, allows high braking forces to be transmitted and, on the other hand, as far as the transmission of heat from the friction disk to the brake-disk hub is concerned, provides for the best possible insulation effect with, at the same time, a high degree of freedom from warping. In addition, it is advantageous if the depression fully accommodates the collar of the brake-disk hub and/or if the planar depression of the collar of the brake-disk hub accommodates the manufactured head of the rivet to the full extent.

It is thus advantageously possible for the extension of the friction-disk surface in the inward direction as far as the lateral surface of the brake-disk hub to be of essentially planar configuration, which makes it difficult for dirt to accumulate and for water to penetrate into the connection between the brake-disk hub and friction disk.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a three-dimensional illustration of a brake disk according to an embodiment of the invention, with a view of the brake-disk hub.

FIG. 2 shows the brake disk according to FIG. 1 in an enlarged partial section (the section plane contains the axis of rotation), in a state in which it has been rotated in relation to FIG. 1 about a vertical axis located in the drawing plane, in the region where the friction disk is fastened on the brake-disk hub.

FIG. 3 is a yet further-enlarged partial view of a rivet from FIG. 2 rotated through 180 degrees.

DETAILED DESCRIPTION OF THE DRAWINGS

Figure 4:
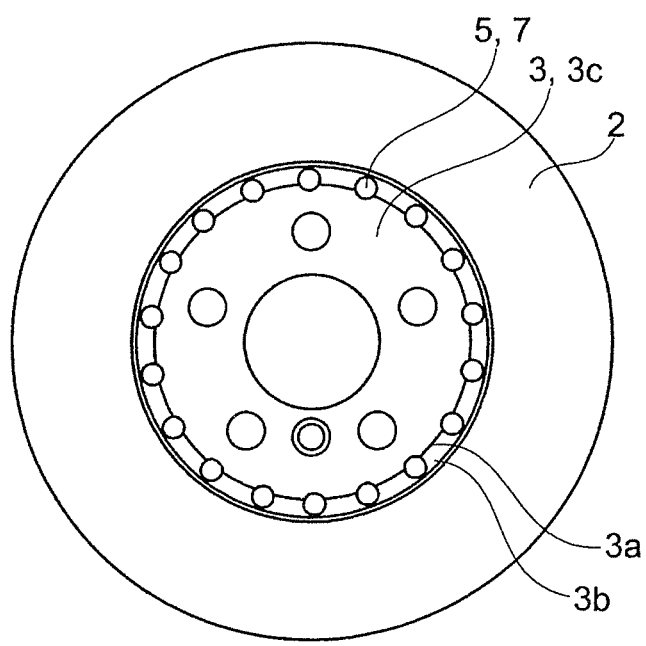
FIG. 4 is a plan view of the chamber side of the brake disk.

The brake disk 1 illustrated in the figures includes a brake-disk hub 3 and a friction ring 2 and is provided for installation on a wheel hub (not shown) in order to rotate therewith, during operation, about the axis of rotation D. The single-piece, internally cooled friction ring 2, which is produced from gray cast iron, comprises two friction disks 2', 2" with webs 2'" which are located therebetween, and connect the friction disks to one another, for cooling-air guidance. The annular friction disk 2', which is located closer to the brake-disk hub 3 in the axial direction, i.e. as seen in the direction of the axis of rotation D, extends radially R (as seen in relation to the axis of rotation D), by way of a so-called fastening extension 9, a certain amount further in the direction of the axis of rotation D than the other friction disk 2", which is further away from the brake-disk hub 3 in the axial direction.

In the region of overlap between the aforementioned fastening extension 9 of the friction disk 2' and a collar 3b, which projects outward in the radial direction R from the free end of the lateral surface 3a of the brake-disk hub 3, said lateral surface being circular-cylindrical in relation to the axis of rotation D, the brake-disk hub 3 is connected to the friction disk 2' and thus to the friction ring 2, via axially extending rivets 5. In this regard, the text here (and in particular in the introductory part of the description) refers to a connection between the brake-disk hub 3 and the friction ring 2.

In the lateral surface 3a of the brake-disk hub 3, and to some extent also in the base 3c of the brake-disk hub 3, cutouts 7 are distributed uniformly over the circumference of the brake-disk hub 3, the rivets 5 projecting into said cutouts, i.e. the rivets 5 being placed at least to some extent therein. Each of these cutouts 7, which also form reduced-wall-thickness portions 7, extends in the axial direction around the respectively associated, likewise oriented rivet 5 and serves to accommodate the latter to some extent and/or to accommodate the set rivet 5 during installation, i.e. the connection of the brake-disk hub 3 to the friction ring 2, as can be seen in the axial direction. The cutouts 7 here are essentially in the form of a semicircular cylinder and are formed in the lateral surface 3a of the brake-disk hub 3 during casting or forging, and therefore, although said lateral surface 3a is weakened in the region of the cutouts 7, it still forms a closed wall on the inside, i.e. as seen from the axis of rotation D. Of course, through-passages in the form of bores are also provided, pretty much as an extension to the cutouts 7, in the collar 3b of the brake-disk hub 3, and the rivets 5 are fitted through these. These cutouts 7 therefore allow the rivets 5 to be arranged closer to the axis of rotation D.

Figure 5:
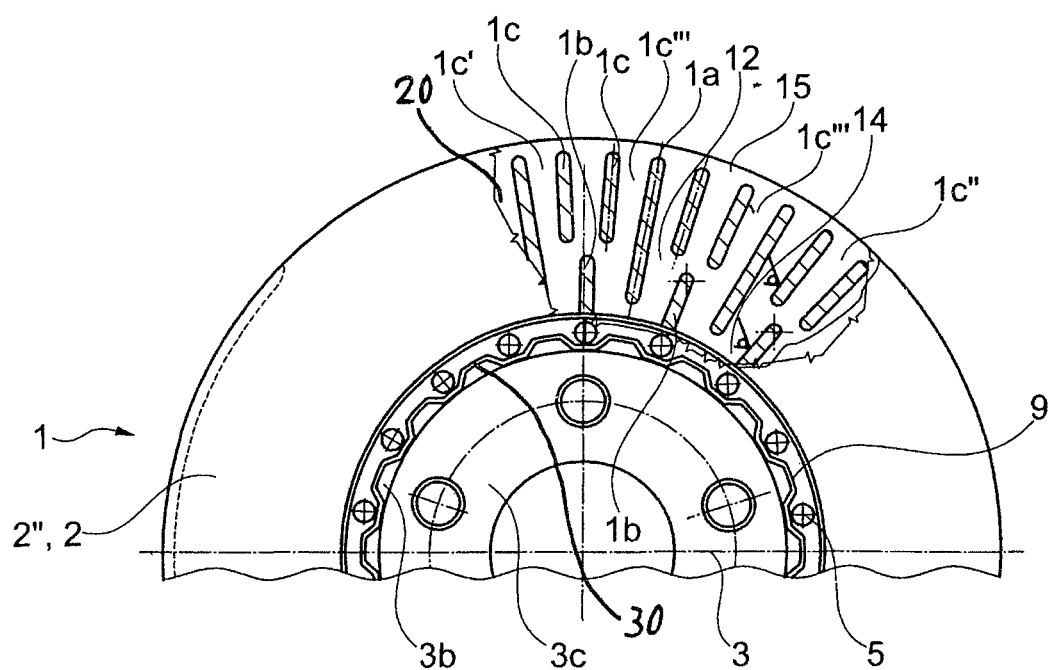
FIG. 5 is a plan view of part of the rear side of the brake disk rotated through 180 degrees in relation to FIG. 4, the connection between two friction disks via webs being illustrated by virtue of part of the friction disk being cut away.

FIG. 5 shows, on the inside of the friction disk 2' of the brake disk 1, a combination of webs 1a and relatively shorter webs 1b, 1c of the internally ventilated brake disk 1 which is repeated in a geometrically regular manner in the circumferential direction over the circular-ring surface of said friction disk. The friction disks 2', 2" of the friction ring 2 are connected to one another via the webs 1a and the relatively shorter webs 1b, 1c, wherein the webs 1a, at the same time, bound cooling channels 20, which are repeated in a likewise geometrically regular manner in the circumferential direction over the circular-ring surfaces of the friction disks 2', 2". The cooling channels 20 each extend from an inner-circumference periphery 14 of the friction disks 2', 2" at the beginning of the webs 1a as far as an outer-circumference periphery 15 of the friction disks 2', 2" of the brake disk 1.

As seen in the circumferential direction, centrally in each cooling channel 20 between the respectively equal-length webs 1a within the friction disks 2', 2", the shorter web 1b extends in each case from the vicinity of the inner-circumference periphery 14 of the friction disks 2', 2", in the direction of the outer-circumference periphery 15 of the latter, as far as a first diameter 12 of the friction disks 2', 2". Proceeding therefrom, two first further shorter webs 1c, which are offset in the circumferential direction in relation to the shorter web 1b within the cooling channel 20, extend further outward in the radial direction as far as the outer-circumference periphery 15, one offset to the left, and the other offset to the right. The first further shorter webs 1c divide up the cooling channels 20, in the radially outward direction from the relatively shorter web 1c, into three flow channels 1c', 1c', 1c'''. All the webs 1a, 1b, 1c have essentially the same web width and are rounded at the front and rear. The radially outer ends of the respective webs 1a, 1c here are located on the same circle circumference in the vicinity of the outer-circumference periphery 15, and the radially inner ends of the respective webs 1a are located on the same circle circumference in the vicinity of the inner-circumference periphery 14, of the brake disk 1. Moreover, starting from each of the relatively shorter webs 1b, the friction disk 2', which is directed toward the brake-disk hub 3, is extended in the radially inward direction and, level with the collar 3b of the brake-disk hub 3, is provided in the axial direction with a bore 21 which serves to accommodate the rivet 5, which fastens the friction disk 2' on the brake-disk hub 3. Closing heads 5'''' of all the rivets 5 are located on the visible side of the fastening extension 9 of the friction disk 2', whereas the manufactured heads 5" of the rivets 5 are fully recessed in a planar depression 23 of the collar 3b of the brake-disk hub 3, as illustrated in FIG. 2. The friction disk 2', which is directed toward the brake-disk hub 3, likewise has an axially directed depression 27, which is intended for supporting the collar 3b of the brake-disk hub 3 and of which the internal diameter, on account of the radial play 25, is greater than an external diameter of the collar 3b, and therefore the friction disk 2' and the brake-disk hub 3 are centered in relation to one another exclusively by means of the rivets 5.

FIG. 3 shows a view of part of a rivet 5 designed in the form of semitubular rivets, measuring 5 mm×13 mm, with a manufactured head 5" and a stem 5'. In the direction of the manufactured head 5", the rivet stem 5' is designed to be conical with an increasing diameter. In the direction of the rivet stem 5', the manufactured head 5" has an undercut, and therefore the angle designated by a double arrow F measures essentially 88 degrees. The extent of a radius R between the cone 5''' of the rivet stem 5' and the undercut of the manufactured head 5" is not defined and is established by manufacturing. The cone 5''' has a length of at least 1.5 mm and at most 4 mm, the diameter of the cone 5''' at the manufactured head 5" being 5.33 mm. Tests have found that this rivet geometry, along with self-centering of the rivet during the operation of setting the rivet 5, results in an advantageous contact pattern with a 100% amount of contact, which gives rise to optimum centering and force transmission. In addition, the conical rivet stem 5' and the undercut F of the manufactured head 5" provide for perfect sealing of the rivet connection and, consequently, protection against corrosive media.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disk for a disk brake, comprising:
   a brake-disk hub;
   at least one friction ring;
   axially directed rivets connecting the at least one friction ring to said brake-disk hub, wherein
   a lateral surface of the brake-disk hub is provided with reduced-wall-thickness portions and/or through-passages, which are axially directed material cutouts located on the outer circumference of the lateral surface of the brake-disk hub and serve for the at least partial placement of the axially directed rivets,
   the friction ring and the brake-disk hub are centered in relation to one another exclusively via the rivets,
   starting from a manufactured head, at least over a subregion of its stem in a region of the brake-disk hub, each rivet, prior to being deformed, is designed so as to taper conically in the direction of a rivet-closing head, and
   a transition from each rivet stem to each manufactured head of each rivet is provided with an axial undercut on each manufactured head of each rivet.

2. The brake disk as claimed in claim 1, wherein
   the friction ring has at least one fastening extension, which is directed inward from a friction surface and to which a collar of the lateral surface of the brake-disk hub is connected by the rivets.

3. The brake disk as claimed in claim 2, further comprising:
   bores for accommodating the rivet in the collar of the brake-disk hub, each said bore corresponding to bores in the fastening extension for accommodating each rivet, having a planar depression at each end which is directed away from the friction disk,
   each planar depression serves to accommodate each manufactured head of each rivet at least to some extent.

4. The brake disk as claimed in claim 3, wherein
   each planar depression of the collar of the brake-disk hub fully accommodates each manufactured head of each rivet.

5. The brake disk as claimed in claim 1, wherein
   the rivets are made of an austenitic, stainless steel.

6. The brake disk as claimed in claim 1, wherein
   the brake-disk hub is made of light metal, a steel or a non-metal material.

7. The brake disk as claimed in claim 1, wherein
   the brake-disk hub and the friction ring are connected to one another by orbital riveting.

8. The brake disk as claimed in claim 1, wherein
that side of the friction ring which is directed towards the brake-disk hub has an axially directed depression, which is intended for accommodating the collar of the brake-disk hub.

9. The brake disk as claimed in claim 8, wherein
an internal diameter of the depression is greater than an external diameter of the collar, and therefore the friction ring and the brake-disk hub are centered in relation to one another exclusively via the rivets.

10. The brake disk as claimed in claim 8, wherein
the depression fully accommodates the collar of the brake-disk hub.

\* \* \* \* \*